(12) United States Patent
Mauti, Jr.

(10) Patent No.: US 9,817,838 B2
(45) Date of Patent: Nov. 14, 2017

(54) PURGING USER DATA FROM VEHICLE MEMORY

(71) Applicant: General Motors LLC, Detroit, MI (US)

(72) Inventor: Thomas K. Mauti, Jr., Lake Orion, MI (US)

(73) Assignee: General Motors LLC, Detroit, MI (US)

( * ) Notice: Subject to any disclaimer, the term of this patent is extended or adjusted under 35 U.S.C. 154(b) by 335 days.

(21) Appl. No.: 14/632,908

(22) Filed: Feb. 26, 2015

(65) Prior Publication Data

US 2016/0253348 A1  Sep. 1, 2016

(51) Int. Cl.
*G06F 17/00* (2006.01)
*G06F 17/30* (2006.01)

(52) U.S. Cl.
CPC .. *G06F 17/30117* (2013.01); *G06F 17/30129* (2013.01)

(58) Field of Classification Search
CPC .... G06F 17/30; G06F 17/00; G06F 17/30117; G06F 17/30129

USPC .................................................. 707/600–899
See application file for complete search history.

(56) References Cited

U.S. PATENT DOCUMENTS

2013/0159230 A1* 6/2013 Weir .................. G01C 21/3617
706/20

* cited by examiner

*Primary Examiner* — Isaac M Woo
(74) *Attorney, Agent, or Firm* — Christopher DeVries; Reising Ethington P.C.

(57) ABSTRACT

A communication system and a method for purging user data stored in a vehicle. The method carried out by the system includes: (a) receiving an input associated with a future time for performing a purge of user data in a vehicle module; (b) determining a first expiration threshold associated with the input; (c) determining one or more additional expiration thresholds based on the first expiration threshold; (d) monitoring vehicle parameter values associated with the first and additional expiration thresholds; (e) based on the parameter values and the first and additional expiration thresholds, determining to initiate a user data purge event; and (f) purging the user data based on the determination of step (e).

10 Claims, 3 Drawing Sheets

PURGING USER DATA FROM VEHICLE MEMORY

TECHNICAL FIELD

The present invention relates to protecting user data stored in vehicle memory, and more particularly, to purging the user data according to predetermined criteria.

BACKGROUND

Vehicle head units may be configured to store information associated with a vehicle occupant. For example, this information may be obtained following the pairing of a mobile device to the vehicle head unit. The stored information may improve the user's vehicle experience by seamlessly enabling data stored on the user's mobile device to be used by the vehicle head unit thereby providing vehicle services to the occupant which might not otherwise be available. After a time, the user may desire to remove this information from the head unit. And head unit application may provide a system menu tree having a selectable option for deletion (purging) of any stored information associated with the specific user. Thus, the user may perform the deletion by accessing the head unit and making the appropriate selection. Thereafter, the user's information is erased from the system.

SUMMARY

According to one embodiment of the invention, there is provided a method of determining when to purge user data stored in a vehicle. The method includes: (a) receiving an input associated with a future time for performing a purge of user data in a vehicle module; (b) determining a first expiration threshold associated with the input; (c) determining one or more additional expiration thresholds based on the first expiration threshold; (d) monitoring vehicle parameter values associated with the first and additional expiration thresholds; (e) based on the parameter values and the first and additional expiration thresholds, determining to initiate a user data purge event; and (f) purging the user data based on the determination of step (e).

According to another embodiment of the invention, there is provided a method of determining when to purge user data stored in a vehicle. The method includes: (a) determining a plurality of expiration thresholds associated with one or more vehicle system modules (VSMs), wherein one of the plurality of expiration thresholds is a seed-input expiration threshold, and the remaining expiration thresholds are associated with the seed-input expiration threshold; (b) storing the plurality of expiration thresholds in memory of a vehicle module configured to execute a data deletion process that determines when to purge user data; (c) receiving a plurality of expiration values; (d) based on the plurality of expiration thresholds and the plurality of expiration values, determining a purge event using the data deletion process application, wherein the determination of the purge event includes correlating the expiration thresholds to one another or correlating the expiration values to one another; and (e) triggering the purge event when at least one of the plurality of expiration values correspond to at least one of the plurality of expiration thresholds.

According to another embodiment of the invention, there is provided a computer program product that includes a non-transitory computer readable medium for a vehicle module coupled to a plurality of vehicle system modules (VSMs). The vehicle module includes a data deletion process stored on the computer readable medium having instructions for determining when to execute a purge of user data. The instructions include: storing a plurality of expiration thresholds associated with a purge event, wherein the purge event includes purging user data stored at the vehicle; receiving vehicle parameter values from one or more VSMs in the vehicle; comparing the vehicle parameter values and the plurality of expiration thresholds to one another; determining the purge event based on the comparison, wherein the determination includes determining whether an aberration value or an aberration threshold exists among the plurality of expiration thresholds and the received vehicle parameter values, and when an aberration value or aberration threshold is determined, removing the aberration value or the aberration threshold from the determination of the purge event; and providing an indication of the purge event.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
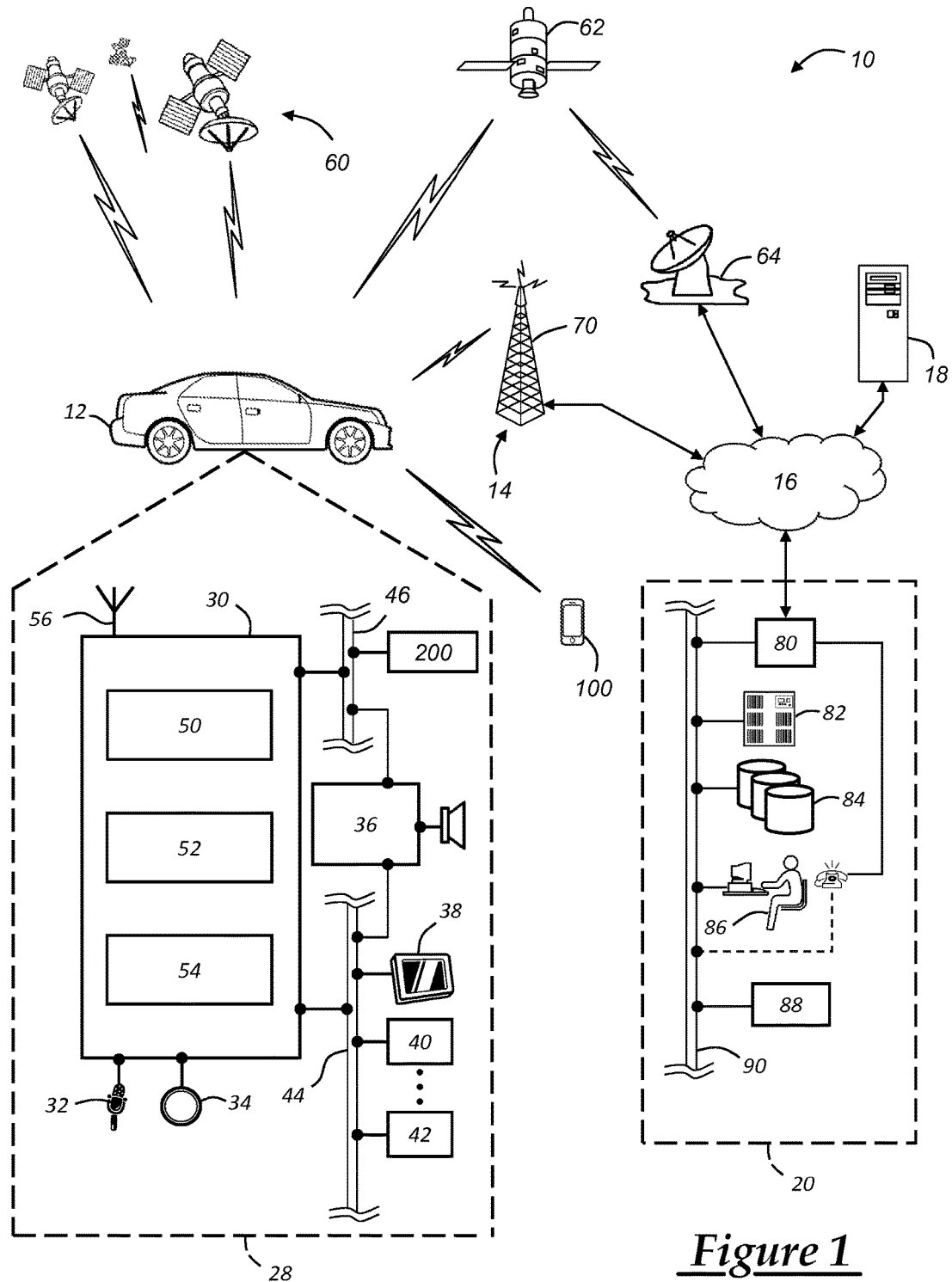
FIG. 1 is a block diagram depicting an embodiment of a communications system that is capable of utilizing the method disclosed herein.

The system described below includes a vehicle module that determines when to execute a purge or deletion of user data stored in a vehicle. Modern vehicles include systems and subsystems capable of storing data arising from a connection with a user or occupant of the vehicle. For example, many infotainment units in modern vehicles enable the user to pair a mobile device such as a smartphone to the infotainment unit, download the user's contact information, and store it in vehicle memory. In addition, information may be acquired with and without explicit user permissions—e.g., vehicles may store information associated with a mobile device's software applications, vehicle trip odometer information, user call history information, historical GPS and routing information, and driving habit information, just to name a few examples. The methods described herein pertain to knowing when to purge this information from various vehicle memory devices (e.g., from the infotainment unit, from a GPS device, from a telematics unit, etc.) and ensuring that this purge occurs, even when the security of the vehicle has been compromised.

Purging information may be desirable, for example, when the user transfers ownership of the vehicle to another, when the user returns a rented or leased vehicle, or in some instances, at regular intervals as a precautionary measure against data theft.

Since vehicles are a source of information, a malicious attacker or hacker that has compromised the vehicle's security further may attempt to inhibit the vehicle user from purging the data so that the attacker may acquire or retain an ability to access the data. In one example, the user may schedule a data purge using the infotainment unit—e.g., coinciding with the user's return of a rental vehicle; however, the attacker may gain control of one of the vehicle systems in order to trick the vehicle into perceiving that the scheduled time for purging has not yet occurred, and thereby acquire or retain access even after the vehicle has been returned.

The present system and methods include receiving an input that is associated with an expiration threshold and storing this threshold in vehicle memory. The method monitors vehicle parameter data received from various sensors in the vehicle (e.g., such as clock, timers, counters, tire pressure sensors, oil life sensors, etc.). When the parameter data meets, exceeds, or fulfills the expiration threshold, then the user's data is purged. As a counter-measure to malicious attack, the method further includes using multiple expiration thresholds and monitoring additional sensors for corresponding parameter data. When one or more parameter data values (or thresholds) is inconsistent with the entirety, the method may set aside the outlier(s) or aberration(s) and still perform the data purge based on the remaining criteria. Thus, the attacker cannot gain advantage by hacking a single sensor or control unit in the vehicle, and the malicious attack is averted or frustrated. The methods are discussed below following a discussion of an illustrative operating environment.

—Communications System—

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Figure 2:
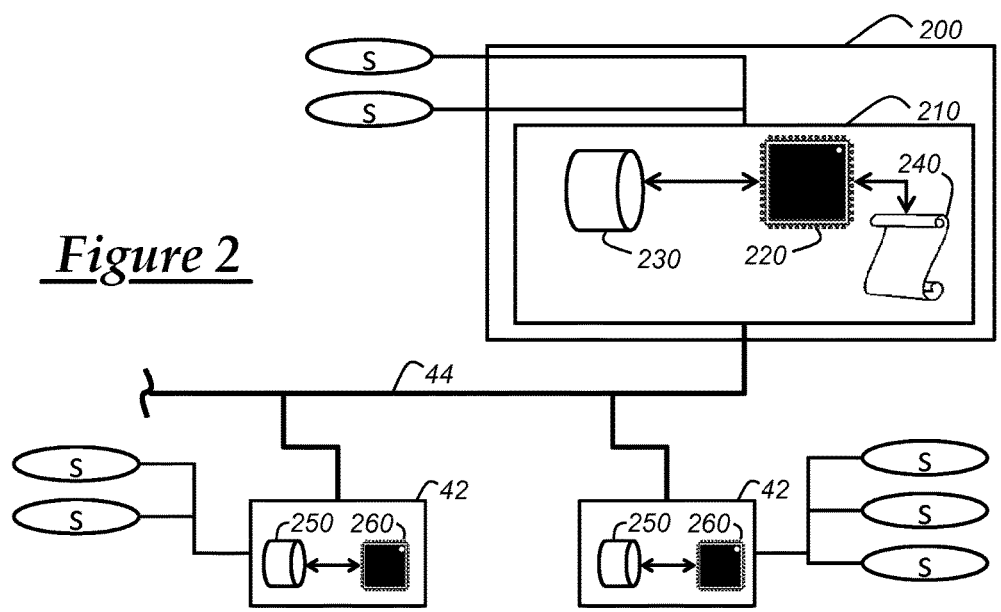
FIG. 2 is a more detailed schematic diagram of a portion of the block diagram shown in FIG. 1.

Apart from the audio system 36 and GPS module 40, as shown in FIGS. 1 and 2, the vehicle 12 can include other vehicle system modules (VSMs) 42 in the form of electronic hardware components that are located throughout the vehicle and typically receive input from one or more sensors (S) and use the sensed input to perform diagnostic, monitoring, control, reporting and/or other functions. Non-limiting examples of sensors include an odometer, a tripometer (e.g., for measuring mileage beginning at a configurable starting point, at mile zero (0)), tire pressure monitor(s), ignition counter(s), engine run-time monitor(s), engine run-time counter(s), oil life monitor(s), fuel consumption monitor(s) (e.g., including monitors for a total fuel consumption), vehicle door opening sensor(s), real-time or vehicle clock sensor(s), just to name a few examples. At least some of the VSMs 42 may comprise any suitable processor 250, memory 260, and electronic circuitry coupled to a communications bus 44, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

As also shown in FIGS. 1 and 2, the vehicle electronics 28 may also include a human-machine interface (HMI) device such as a vehicle head unit or vehicle infotainment unit (VIU) 200 which may include some of the vehicle electronics previously discussed (e.g., the audio system 36, the visual display 38, etc.). As used herein, the VIU 200 may include all suitable software and hardware for providing vehicle entertainment and infotainment services to the vehicle users. For example, the VIU may have a vehicle module 210 such as an electronic control unit (ECU) that includes a processor 220 and memory 230 wherein the memory stores software, firmware, or both. In some implementations, the infotainment unit 200 may be configured as a VSM 42 and may be coupled to one or more sensors (S) as well.

In one embodiment, the vehicle module 210 may be configured with a data deletion process application software or program 240 that is at least partially capable of executing the methods described herein—being stored on memory 230 and executable using processor 220. As will be described in greater detail below, the data deletion process 240 may receive an expiration threshold as an input, determine or derive other associated expiration thresholds based on the input, receive and monitor multiple vehicle parameter values relevant to the thresholds (e.g., received from various VSMs 40), and determine a future purge event based on the thresholds and the parameter values. Further, the data deletion process may determine whether any expiration values or thresholds are inconsistent with the remaining values and thresholds. Thus, the data deletion process 240 may determine corrupted or compromised thresholds and/or parameter values. Thereafter, the data deletion process may determine the purge event in spite of any corrupted thresholds/values.

Wireless carrier system 14 is preferably a cellular telephone system that includes a plurality of cell towers 70 (only one shown) and may include any other suitable communication equipment (e.g., mobile switching centers (MSC), base transceiver stations (BTS), evolved node Bs (eNodeB or eNB), etc.; e.g., depending on the type of wireless communication or architecture). The communication equipment may include any other networking components required to connect wireless carrier system 14 with land network 16. Each cell tower 70 may include sending and receiving antennas, the cell tower(s) being connected to the communication equipment either directly or via intermediary equipment. Cellular system 14 can implement any suitable communications technology, including for example, analog technologies such as AMPS, or the newer digital technologies such as CDMA (e.g., CDMA2000), GSM/GPRS, or LTE. As will be appreciated by those skilled in the art, various cell tower/communication equipment arrangements are possible and could be used with any type of wireless system 14.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

The mobile device 100 may be any electronic device which may be used to make mobile telephone calls across a wide geographic area where transmissions are facilitated by the wireless carrier system 14 (i.e., when the mobile device is connected to the wireless carrier system).

The mobile device 100 may include any suitable hardware, software, and firmware enabling cellular telecommunications, short-range wireless communication (such as Wi-Fi or Bluetooth), and actuation of mobile device applications. The applications include software or programs stored on the device and executable using a mobile device interface. Such applications may enable a vehicle user to communicate with the vehicle 12 and/or control various aspects or functions of the vehicle. For example, the application may communicate with the vehicle directly or may also allow the user to connect with the call center 20 or a call center advisor 86 at any time. Non-limiting examples of the mobile device 100 include a cellular telephone, a personal digital assistant (PDA), a smartphone, a personal laptop computer or tablet computer having two-way communication capabilities, a netbook computer, or combinations thereof.

The mobile device 100 and the vehicle 12 may be used together by a occupant known as an authorized vehicle user. However, the vehicle user does not need to be the driver of the vehicle 12 nor does the vehicle user need to have ownership of the mobile device 100 or the vehicle 12 (e.g., the vehicle user may be an owner or a licensee of either or both).

—Method—

Figure 3A:
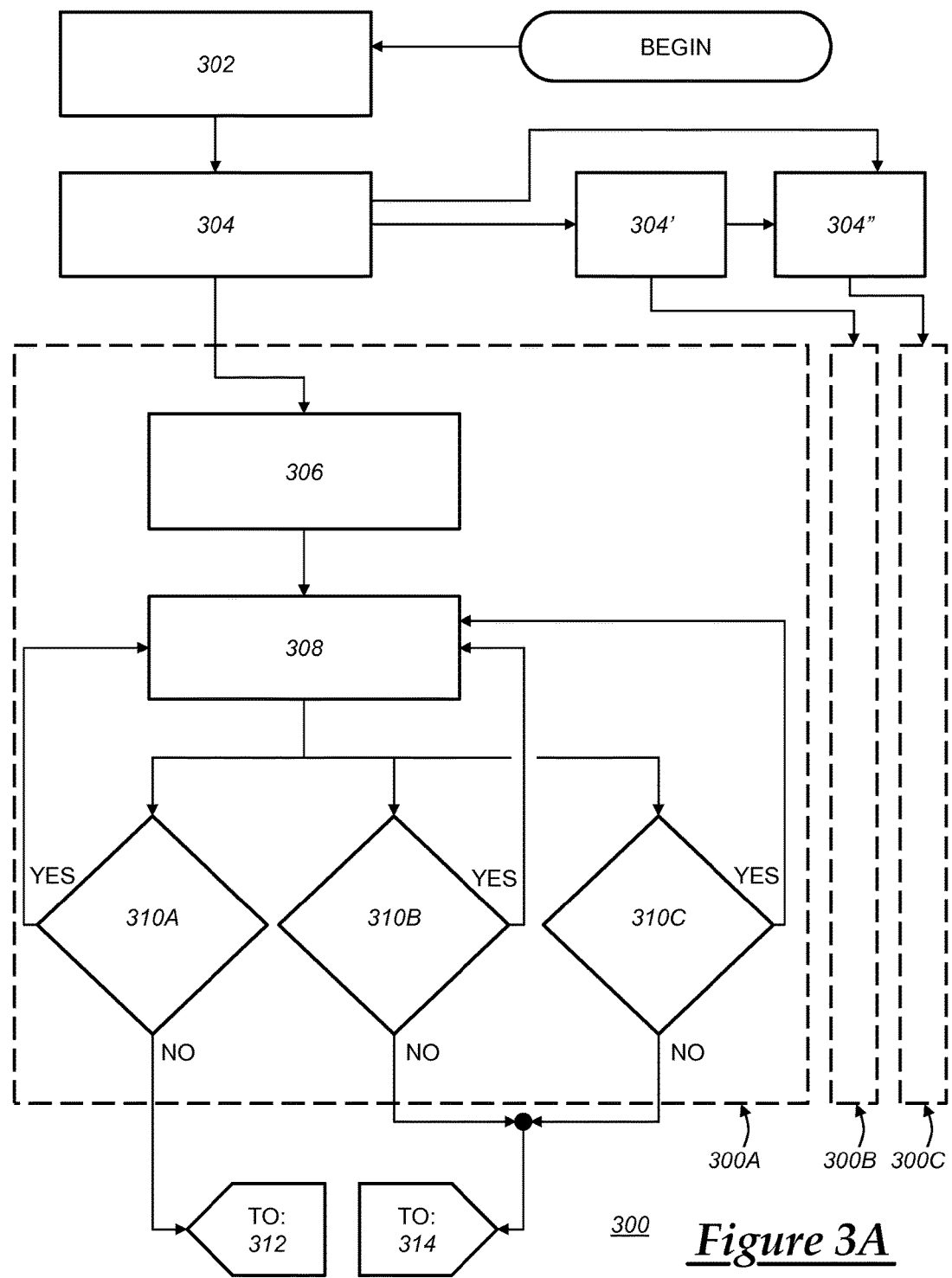
FIGS. 3A-3B is a flow diagram illustrating a method of using the communication system shown in FIG. 1.
Figure 3B:
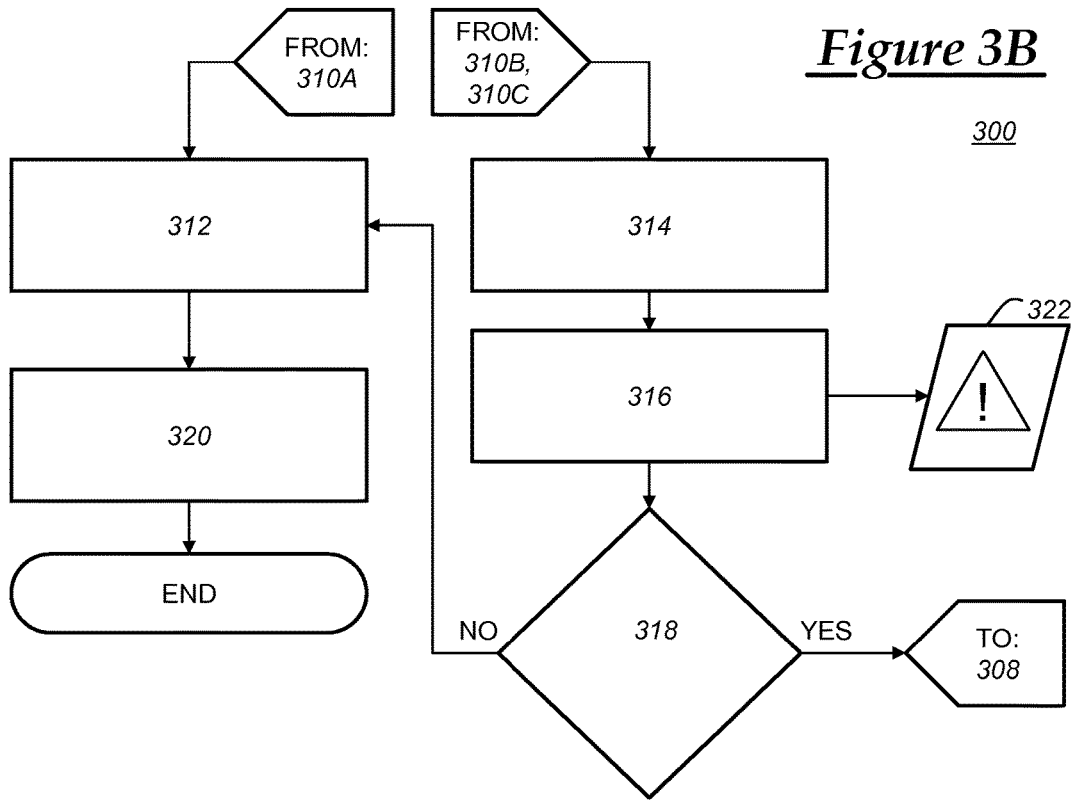

Turning now to FIGS. 3A-3B, there is shown one illustrative embodiment of a method of using the communication system 10 described above. More specifically, the figures show a method 300 for implementing the data deletion process 240 to help ensure that user data stored in vehicle 12 is purged. The method begins at step 302 wherein user data is stored in vehicle memory 230. Non-limiting examples of user data include any data associated with a paired-smartphone's software applications, odometer information, tripometer information, user call history, historical vehicle GPS and routing information, routing preferences, user driving habits, speech recognition tuning, application configuration, application credentials, wireless network data (e.g., SSID, username, password), head unit preferences (e.g., favorites), and user listening history. Further, the user data may include any data stored in permanent or temporary memory with or without notification to the user. In other embodiments, the user data may be stored alternatively or additionally on memory 54 of the telematics unit, memory 250 of one of the VSMs, any other vehicle memory, etc. Following step 302, the method proceeds to step 304.

In step 304, the data deletion process 240 (e.g., of VIU 200) of the vehicle may receive an input or seed associated with a first expiration threshold. The input may be the first expiration threshold or may be some value used to determine the first expiration threshold. For example, the input may be associated with a time and date value (e.g., a vehicle or satellite clock time), a vehicle service value (e.g., a quantity of oil changes or transmission fluid changes, etc.), a vehicle-life value (e.g., an engine or other component run-time value, a future odometer value, a future tripometer value), or a location value (e.g., a geographic coordinate such as a dealership or rental location), just to name a few examples. Other inputs will be apparent to skilled artisans.

The manner in which the input is received may take a variety of forms. For example, the input may be received directly via an interface on the VIU 200 (e.g., via pushbutton entry (34), via voice command, etc.). In other embodiments, the input is received by the data deletion process 240 indirectly (e.g., via the call center 20 or the mobile device 100). In addition, the backend or call center 20 may provide the input with or without prompting to or request by the vehicle user. And the mobile device 100 may provide the input via a web portal or via the vehicle-specific software application stored thereon. Mobile device input may be received by the telematics unit 30 of the vehicle 12 via short range or long range communication, and in some embodiments, the input may be routed through the call center 20 for authentication.

The first expiration threshold may be any suitable indicator of when the user's data should be purged. In one embodiment, the first expiration threshold is a future time and date which may be particularly suitable for rental vehicles; thus, when the future time and date parameter value occurs, the purge would be expected to occur. In another embodiment, the first expiration threshold is a mileage or odometer reading which may be particularly suitable for leased vehicles (e.g., for a vehicle lease agreement comprising 12000 miles, 24000 miles, etc.); thus, when the mileage parameter value equals or the threshold, the purge would be expected to occur. These of course are examples and other expiration thresholds are contemplated as well. Following step 304, the method proceeds to step 306.

In step 306, the first expiration threshold is stored in VIU memory 230. Of course, in other embodiments, e.g., where the vehicle module 210 is located elsewhere in the vehicle 12, the first expiration threshold may be stored in VSM memory 250, telematics unit memory 54, etc. Following step 306, the method proceeds to step 308.

In step 308, the data deletion process 240 monitors a first vehicle parameter that is received ultimately from one or more vehicle sensors (S). Monitoring includes the sensor(s) (S) communicating a value to an associated VSM 42, the VSM 42 communicating the value to the bus 44, and the bus 44 communicating the value to the vehicle module 210. The value of the vehicle parameter may be received into memory 230 and used by the processor 220. Thereafter, the method 300 proceeds to steps 310A, 310B, and 310C.

Steps 310A, 310B, and 310C may have a logical "OR" relationship; i.e., if either of 310A or 310B or 310C are determined to be negative (NO), the method 300 may proceed to steps 312 or 314, as described below. Otherwise, where 310A, 310B, and 310C are all positive (YES), the method loops back and repeats step 308. In step 310A, the data deletion process 240 determines whether the present vehicle parameter value is less than the first expiration threshold. If the value is less than the first threshold, the method loops back to step 308; otherwise, the method proceeds to step 312. In continuing with the mileage example above, if the present mileage value is 23,001 and the expiration threshold is 24,000, then the data deletion process 240 will loop back to step 308; however, if the mileage value is 24,001, then the data deletion process would proceed to step 312.

In step 310B, the data deletion process 240 determines whether the value of the present vehicle parameter is consistent with the first expiration threshold. The determination of consistency may include using preconfigured or predetermined ranges so that the data deletion process 240 is able to make objective determinations. For example, step 310B may include determining whether the present value represents a reasonable (or physically possible) value with respect to the first expiration threshold. Continuing with the mileage example (again assuming the expiration threshold is 24,000), if the present mileage value is 23,001 when the former mileage value was 23,500, then the data deletion process 240 will determine that the first vehicle parameter value is inconsistent with the first expiration threshold and proceed to step 314. Or in another example, the vehicle parameter may be a miles-per-hour parameter associated with multiple sensors—e.g., a clock sensor that times a 1 hour period, and partial-odometer reading during that period (e.g., that should be less than 100 miles, assuming safe driving conditions). Thus, where the value of the vehicle parameter is 150 miles in 1 hour, the data deletion process 240 will determine that the first vehicle parameter value is inconsistent with the first expiration threshold, and the method would proceed to step 312. Conversely, where the value was 30 miles in 1 hour, the data deletion process 240 would determine that the value was consistent with the threshold and then would loop back to step 308.

And in step 310C, the data deletion process 240 determines whether the value of the first vehicle parameter in light of the first expiration threshold correlates to other values of vehicle parameters in light of their respective expiration thresholds (e.g., second, third, fourth, etc. vehicle parameters and second, third, fourth, etc. expiration thresholds). In FIG. 3A, two additional thresholds are shown being derived from the first threshold in step 304; however, more or fewer additional thresholds are possible. From step 304, a sequence 300A follows (which comprises steps 306, 308, 310A, 310B, and 310C). From step 304', a sequence 300B follows, and a sequence 300C follows step 304". Step 310C is discussed in greater detail below (following a discussion of 304', 304" and sequences 300B and 300C).

In step 304', a second expiration threshold is derived from the first derivation threshold using the vehicle module 210 (e.g., the data deletion process 240) by determining a vehicle threshold that logically correlates to or is associated with the first expiration threshold. Continuing again with the mileage example, where the first expiration threshold is an odometer reading of 24,000 miles, the second expiration threshold may be a reasonable engine hour run-time. For example, if the vehicle module 210 (or other VSM 42) is programmed or determines that the average user speed of vehicle 12 is approximately 20 miles per hour (mph), the run-time (second) expiration threshold may be 1200 hours. Or in another instance, the run-time threshold may be estimated based on actual vehicle use; e.g., periodically, a new average-vehicle-mph may be calculated and used to re-determine the run-time threshold. The sequence 300B which follows step 304' may be similar or have similar steps to those shown in sequence 300A. Except of course, the second (derived) expiration threshold will be measured against or compared to a second vehicle parameter such as an engine run-time value (e.g., similar to steps 310A, 310B, 310C).

In step 304", a third expiration threshold may be derived in a manner similar to that of the second threshold expiration; therefore, this will not be re-described here. Continuing with the same mileage example, the third expiration threshold could be a measure of six vehicle engine oil changes—e.g., where the data deletion process 240 assumes the average user changes the engine oil every 4,000 miles, six oil-change cycles would approximate 24,000 miles (thereby correlating to the first and second expiration thresholds). Sequence 300C may operate in a similar fashion to sequence 300A or 300B, except that a third vehicle parameter is used having values that are tested against the third (derived) expiration threshold.

It should be appreciated that the first expiration threshold and/or the second, third, etc. derived thresholds do not need to be specific values; e.g., they may be ranges as well. For example, the second expiration threshold range may be 1200 hours, +/−200 hours (or any other suitable range) or the third expiration threshold may be 6 oil changes, +/−1 oil change (or any other suitable range), just to cite a couple examples.

Returning to step 310C, the data deletion process 240 may determine whether the values of the first, second, third, etc. vehicle parameters correlate with one another. As discussed above, in the mileage example, step 310C may validate that the following values correlate to one another: 23,001 odometer miles, 1150 engine run-time hours, and 5 oil changes. In this example, step 310C would pass and loop back to step 308.

Step 310C may also determine whether the first, second, third, etc. thresholds correlate to one another. For example, whether the 24,000 mile threshold correlates with the 1200 engine run-time threshold and the 6 oil change threshold. In this manner, step 310C may validate that not only are no vehicle parameter values corrupted, but no thresholds have been corrupted either. If the data deletion process 240 determines a correlation failure, the method 300 proceeds to step 314; otherwise, the method loops back and repeats step 308.

Step 312 (FIG. 3B) proceeds from step 310A. In step 312, the data deletion process 240 provides an output or trigger indicating the purge or deletion of user data on one or more vehicle memory devices (e.g., 230, 54, 250, etc.). When the method 300 proceeds from step 310A to step 312, the method has not detected any aberration parameter values or aberration thresholds. Thus, in this scenario, no malicious attack has occurred while the system has monitored for indications of a potential attack. After step 312, the method may proceed to step 320.

In step 320, the vehicle 12 executes the purge of user data from any applicable memory devices. Skilled artisans will appreciate the various techniques which may be employed to purge this data. The method thereafter ends.

Step 314 (FIG. 3B) proceeds from step 310B or 310C. In step 314, the data deletion process 240 may determine one or more aberration values (from among the multiple vehicle parameter values) or one or more aberration thresholds (from among the multiple vehicle expiration thresholds). Such aberrations may be the cause of the inconsistency (in step 310B) or the lack of correlation (in step 310C). Further, any discovered aberration may be considered corrupt, comprised, or tampered-with. Therefore, it may be desirable to identify the aberration and remove it from the data deletion process's criteria. As discussed above, a corrupted parameter value or threshold may be used by a hacker to delay or defer a scheduled purge event (e.g., associated with the first expiration threshold). In this manner, the hacker gains access or retains access to the user's information for a (longer) period of time. Determining which specific value or threshold is an aberration may be accomplished using a holistic approach, by using additional vehicle data, etc. In one embodiment, the data deletion process 240 compares all parameter values. For example, assuming the first expiration threshold is 24,000 miles again, if the present mileage is 12,001 miles (first parameter value), the engine run-time is 2000 hours (second parameter value), and the number of oil changes is ten (third parameter value), then under a holistic approach, the second and third parameter values are considered consistent, however, the first parameter value is an outlier or inconsistent. The data deletion process 240 may determine that the vehicle odometer has been tampered with, or at least identify that the parameter value being reported (e.g., by the associated VSM 42) is corrupt. This of course is merely an example. Other possible embodiments also exist such as using a holistic approach while comparing the expiration thresholds. Following step 314, the method proceeds to step 316.

In step 316, with the aberration identified, the data deletion process 240 may quarantine, segregate, eliminate, omit, or otherwise avoid using the corrupt value(s) or threshold(s) in its determination. This step also may include deleting or destroying the corrupt data. Following step 316, the method may proceed to steps 318 and/or 322.

In step 318, the data deletion process 240 may recheck the remaining expiration threshold(s) and parameter value(s) by performing a validation similar to steps 310A, 310B, and 310C. If following the removal of any aberrations, the data deletion process 240 determines that the expiration threshold(s) have not been met, then the method 300 proceeds to step 308. However, if having removed the aberration(s), the method determines that the expiration threshold(s) have been met, then the method 300 proceeds to step 312 (triggering the purge event). Thereafter again, the method proceeds from step 312 to step 318 and then ends.

In step 322, the data deletion process 240 provides an alert to the vehicle 12 of a potential malicious attack. Thereafter, the vehicle may log this information using on-board diagnostics (OBDII) and/or report this data to the call center 20 for additional corrective actions.

In the implementation above, the first threshold value was given priority. However, it should be appreciated that determinations by the data deletion process 240 could be driven by a priority to second or third expiration thresholds. In addition, while each threshold was discussed with respect to "a" parameter value, multiple parameter values could be used to determine whether or not to PASS the test of steps 310A or 310B.

In another embodiment, the data deletion process is carried and used by a different vehicle device (e.g., the telematics unit 30 or a VSM 42). And in yet another embodiment, the second, third, etc. thresholds are not derived but instead provided to the data deletion process 240 (e.g., via user input, call center input, etc.). Other embodiments will be appreciated by skilled artisans.

Thus, there has been described a communication system that includes a vehicle having a data deletion process for determining when to delete or purge user data stored in vehicle memory. The data deletion process may be configured to use a first expiration threshold to derive additional expiration thresholds; thereafter, the model receives and monitors parameter values which are associated with the different thresholds. The data deletion process is capable of determining one or more corrupted parameter values or thresholds which might otherwise thwart the purging of the user's data. Thus, the data deletion process prevents a malicious attacker from deceiving or tricking vehicle systems thereby delaying/preventing the data purge—thereby enabling the attacker to acquire or retain access to sensitive user data.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of purging user data stored in a vehicle, comprising the steps of:
   (a) receiving an input associated with a future time for performing a purge of user data in a vehicle module;
   (b) determining a first expiration threshold associated with the input;
   (c) determining one or more additional expiration thresholds based on the first expiration threshold;
   (d) monitoring vehicle parameter values associated with the first and additional expiration thresholds, and determining, for a particular one of the expiration thresholds, that its associated vehicle parameter value is an aberration value or that the particular expiration threshold is an aberration threshold;
   (e) based on the parameter values and the first and additional expiration thresholds, determining to initiate a user data purge event; and
   (f) purging the user data based on the determination of step (e), wherein steps (e) and (f) are performed using the remaining expiration threshold(s) other than the particular expiration threshold.

2. The method of claim 1, wherein the first and the additional vehicle parameter values are received from the vehicle sensor(s) via at least one vehicle system module (VSM).

3. The method of claim 1, wherein the input is received from an authorized vehicle user or a vehicle backend.

4. The method of claim 3, wherein one of the first or the additional expiration thresholds is one of a future time and date, a future odometer value, a future tripometer value, a future oil life value; a future vehicle destination, or a predetermined value of vehicle component cycles.

5. A method of determining when to purge user data stored in a vehicle, comprising the steps of:
   (a) determining a plurality of expiration thresholds associated with one or more vehicle system modules (VSMs), wherein one of the plurality of expiration thresholds is a seed-input expiration threshold, and the remaining expiration thresholds are associated with the seed-input expiration threshold;
   (b) storing the plurality of expiration thresholds in memory of a vehicle module configured to execute a data deletion process that determines when to purge user data;
   (c) receiving a plurality of expiration values;
   (d) based on the plurality of expiration thresholds and the plurality of expiration values, determining a purge event using the data deletion process application, wherein the determination of the purge event includes correlating the expiration thresholds to one another or correlating the expiration values to one another; and
   (e) triggering the purge event when at least one of the plurality of expiration values correspond to at least one of the plurality of expiration thresholds.

6. The method of claim 5, wherein the seed-input expiration threshold is associated with a time and date expiration value, a service expiration value, a vehicle-life expiration value, or a location expiration value.

7. The method of claim 5, wherein the remaining expiration thresholds are derived from the seed-input expiration threshold.

8. The method of claim 5, further comprising:
   using the data deletion process, determining that one of the plurality of expiration thresholds or one of the plurality of expiration values has been corrupted;
   based on that determination, eliminating the corrupted expiration threshold or the corrupted expiration value from the determination of the purge event;
   performing step (e); and then
   purging user data from vehicle memory.

9. A computer program product, comprising: a non-transitory computer readable medium for a vehicle module coupled to a plurality of vehicle system modules (VSMs), comprising a data deletion process stored on the computer readable medium having instructions for determining when to execute a purge of user data, comprising:

storing a plurality of expiration thresholds associated with a purge event, wherein the purge event includes purging user data stored at the vehicle;

receiving vehicle parameter values from one or more VSMs in the vehicle;

comparing the vehicle parameter values and the plurality of expiration thresholds to one another;

determining the purge event based on the comparison, wherein the determination includes determining whether an aberration value or an aberration threshold exists among the plurality of expiration thresholds and the received vehicle parameter values, and when an aberration value or aberration threshold is determined, removing the aberration value or the aberration threshold from the determination of the purge event; and providing an indication of the purge event.

10. The computer program product of claim 9, wherein the vehicle module includes one of a vehicle telematics unit, a vehicle head unit, or a vehicle system module (VSM).

\* \* \* \* \*